US 8,315,799 B2

(12) United States Patent
Alewine et al.

(10) Patent No.: US 8,315,799 B2
(45) Date of Patent: Nov. 20, 2012

(54) LOCATION BASED FULL ADDRESS ENTRY VIA SPEECH RECOGNITION

(75) Inventors: Neal J. Alewine, Boca Raton, FL (US); John W. Eckhart, White Plains, NY (US); Peder A. Olsen, Cortlandt Manor, NY (US); Kenneth D. White, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 368 days.

(21) Appl. No.: 12/777,924

(22) Filed: May 11, 2010

(65) Prior Publication Data

US 2011/0282574 A1   Nov. 17, 2011

(51) Int. Cl.
*G01C 21/32* (2006.01)
(52) U.S. Cl. ........ 701/450; 701/427; 701/443; 701/488; 701/539; 704/270; 704/275
(58) Field of Classification Search .................. 701/427, 701/443, 488, 539, 450
See application file for complete search history.

(56) References Cited

U.S. PATENT DOCUMENTS

| 4,891,761 | A   | * | 1/1990  | Gray et al. ............. 701/461 |
| 6,108,631 | A   | * | 8/2000  | Ruhl .................. 704/270 |
| 6,112,174 | A   |   | 8/2000  | Wakisaka et al. |
| 6,230,132 | B1  | * | 5/2001  | Class et al. ............ 704/270 |
| 6,401,068 | B1  | * | 6/2002  | Cherveny et al. ........ 704/275 |
| 6,845,139 | B2  | * | 1/2005  | Gibbons ............... 377/47 |
| 7,292,978 | B2  | * | 11/2007 | Endo et al. ............ 704/243 |
| 7,295,923 | B2  | * | 11/2007 | Hirayama ............. 701/532 |
| 7,328,155 | B2  |   | 2/2008  | Endo et al. |
| 2002/0072917 | A1 |   | 6/2002  | Irvin et al. |
| 2003/0065441 | A1 |   | 4/2003  | Funk |
| 2008/0177469 | A1 | * | 7/2008  | Geelen et al. .......... 701/209 |
| 2008/0275699 | A1 |   | 11/2008 | Mozer |
| 2009/0018840 | A1 |   | 1/2009  | Lutz et al. |
| 2009/0030685 | A1 |   | 1/2009  | Cerra et al. |
| 2010/0030459 | A1 | * | 2/2010  | Geelen et al. .......... 701/200 |
| 2010/0131186 | A1 | * | 5/2010  | Geelen et al. .......... 701/200 |

FOREIGN PATENT DOCUMENTS

| EP | 1758098 A2 | 2/2007 |
| EP | 1646037 B1 | 3/2008 |

OTHER PUBLICATIONS

Balchandran, R. et al. "Dialog System for Mixed Initiative One-Turn Address Entry and Error Recovery" Proceedings of SIGDIAL 2009, pp. 152-155, Queen Mary University of London, Sep. 2009.

* cited by examiner

*Primary Examiner* — Thomas Black
*Assistant Examiner* — Lindsay M Browder
(74) *Attorney, Agent, or Firm* — Law Office of Jim Boice

(57) ABSTRACT

A computer implemented method, system and/or computer program product confirm an orally entered address to a mobile navigation device. The mobile navigation device receives a global positioning system (GPS) root address component from a GPS. The GPS root address component is a text name of a root location at which a mobile navigation device is currently located. The mobile navigation device receives an orally entered address that comprises an oral root address component and an oral subunit component of the oral root address component. In response to the converted root address component matching the GPS root address component, the orally entered address is partitioned into the oral subunit component and the oral root address component, and any additional speech-to-text conversion of the orally entered address after the oral root address component is terminated.

15 Claims, 4 Drawing Sheets

LOCATION BASED FULL ADDRESS ENTRY VIA SPEECH RECOGNITION

BACKGROUND

The present disclosure relates to the field of portable navigation devices, and specifically to speech recognition-enabled portable navigation devices. Still more particularly, the present disclosure relates to determining full address entries on speech recognition-enabled portable navigation devices.

BRIEF SUMMARY

A computer implemented method, system and/or computer program product confirm an orally entered address to a mobile navigation device. The mobile navigation device receives a global positioning system (GPS) root address component from a GPS. The GPS root address component is a text name of the location at which a mobile navigation device is currently located. The mobile navigation device receives an orally entered address, which is an oral root address. Both a GPS returned root address and an orally entered root address are subdivided into subcomponents. Speech-to-text conversion of the orally entered address into a text address creates a converted (oral) root address that is compared on a subcomponent basis to a GPS retrieved root address. A higher level of trustworthiness is assigned to the converted root address over the GPS root address. The navigation device compares the GPS retrieved root address to the converted root address. Any additional speech-to-text conversion of the orally entered address is terminated when the initial converted root address matches the GPS root address relative to city/state location. A complete text address is created using the converted root address and additional larger-scale geographic information from the GPS for the mobile navigation device to process.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
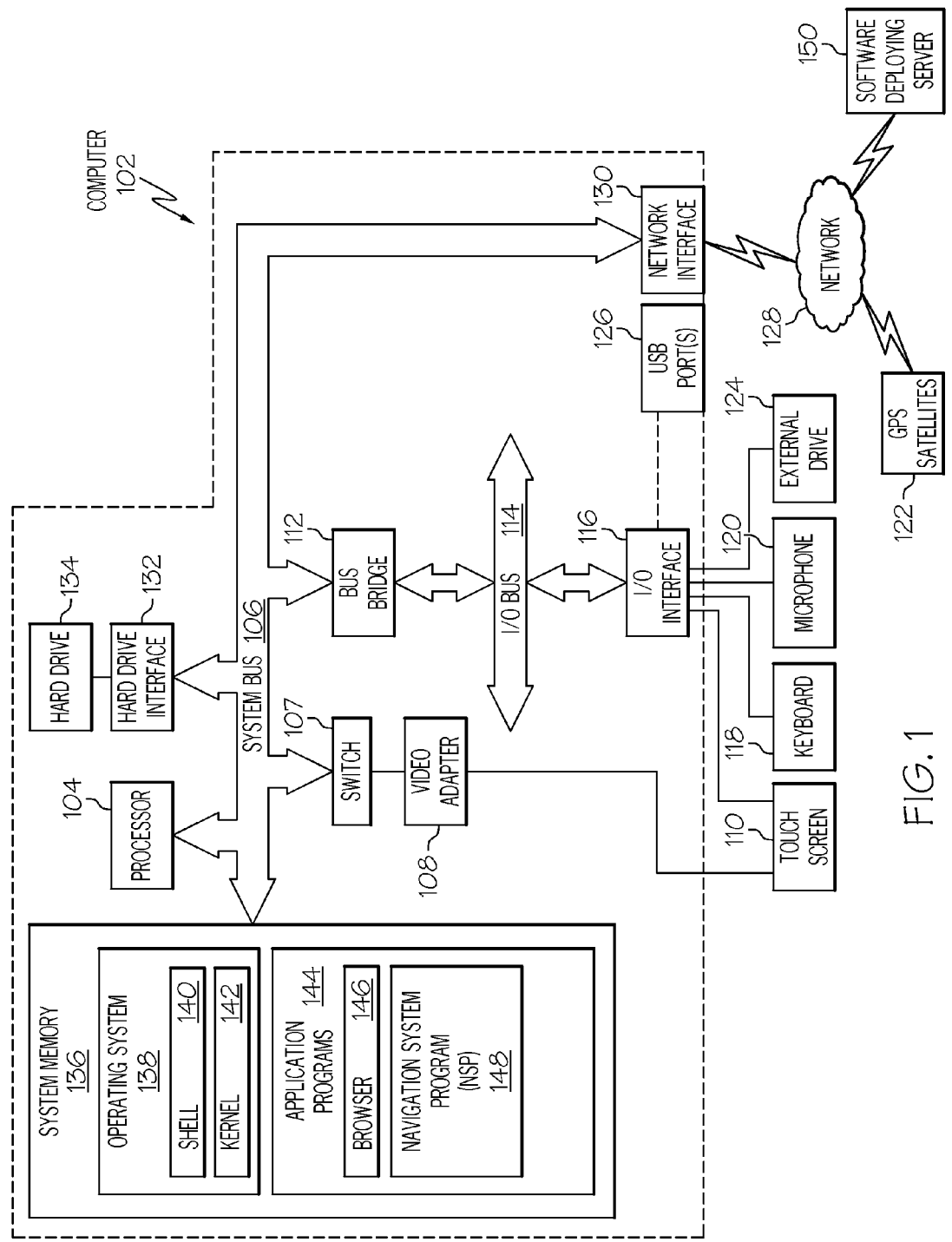
FIG. 1 depicts an exemplary computer in which the present disclosure may be implemented.

With reference now to the figures, and in particular to FIG. 1, there is depicted a block diagram of an exemplary computer 102, which may be utilized by the present disclosure, including as part of a mobile navigation system. Note that some or all of the exemplary architecture, including both depicted hardware and software, shown for and within computer 102 may be utilized by software deploying server 150.

Computer 102 includes a processor unit 104 that is coupled to a system bus 106. Processor unit 104 may utilize one or more processors, each of which has one or more processor cores. A video adapter 108, which drives/supports a display such as touch screen 110, is also coupled to system bus 106. In one embodiment, a switch 107 couples the video adapter 108 to the system bus 106. Alternatively, the switch 107 may couple the video adapter 108 to the touch screen 110. In either embodiment, the switch 107 is a switch, preferably mechanical, that allows the touch screen 110 to be coupled to the system bus 106, and thus to be functional only upon execution of instructions (e.g., navigation system program—NSP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a microphone 120, an external drive 124 (which may include storage devices such as CD-ROM drives, multi-media interfaces, etc.), and external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate, preferably wirelessly, with a software deploying server 150 as well as global positioning system (GPS) satellites 122 via network 128 using a network interface 130. Network 128 may be any wireless network, including satellite-based networks, cellular networks, wireless local area networks, etc.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a navigation system program (NSP) 148. NSP 148 includes code for implementing the processes described below, including those described in FIGS. 2-4. In one embodiment, computer 102 is able to download NSP 148 from software deploying server 150, including in an on-demand basis, such that the code from NSP 148 is not downloaded until runtime or otherwise immediately needed by computer 102. Note further that, in one embodiment of the present disclosure, software deploying server 150 performs all of the functions associated with the present disclosure (including execution of NSP 148), thus freeing computer 102 from having to use its own internal computing resources to execute NSP 148.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
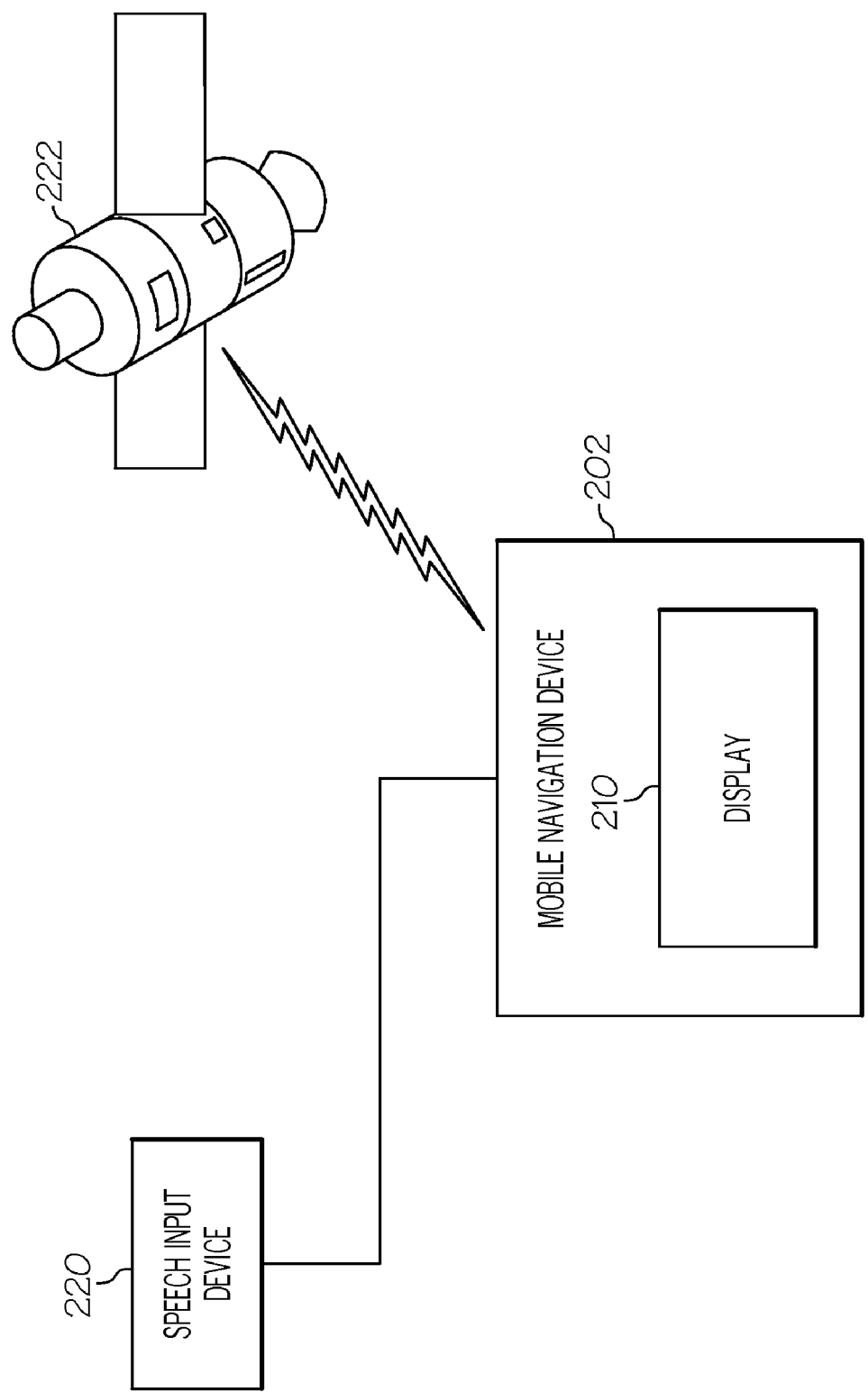
FIG. 2 illustrates an exemplary Global Positioning System (GPS) based navigation system in which the present disclosure may be implemented.

With reference now to FIG. 2, an exemplary mobile navigation device 202, as contemplated for use with the present disclosure, is presented. As noted above, mobile navigation device 202 may utilize a hardware/software architecture described in FIG. 1 for computer 102. Mobile navigation device 202 is in wireless communication with a set of GPS satellites 222. As known in the art, GPS satellites 222 are a set of space-based orbital satellites that provide accurate positioning information to GPS-enabled navigation systems. Mobile navigation device 202 is also coupled to a speech input device 220, such as microphone 120 shown in FIG. 1. In one embodiment, speech input device 220 and mobile navigation device 202 are housed within a single device. Similarly, mobile navigation device 202 comprises a display 210, such as touch screen 110 shown in FIG. 1.

Figure 3:
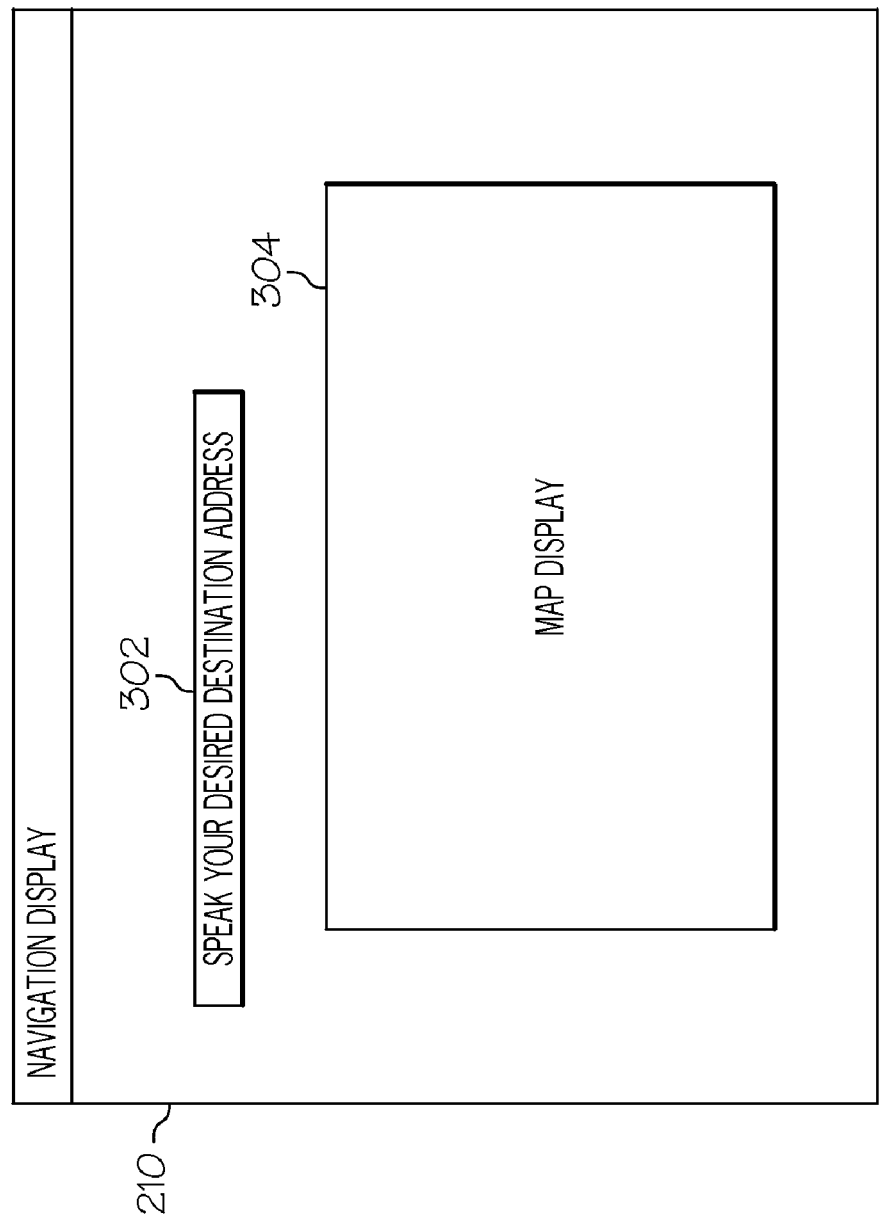
FIG. 3 depicts an exemplary navigation display that is prompting a user for a verbally input address.

As depicted in FIG. 3, this (navigation) display 210 can include an instruction window 302 as well as a map display 304. In the example shown, instruction window 302 is directing a user to verbally speak his desired destination address. Note that no specific instructions are given to the user regarding how much of the address (the street number, the street name, the city name, the state name, etc.) is needed by the system.

Figure 4:
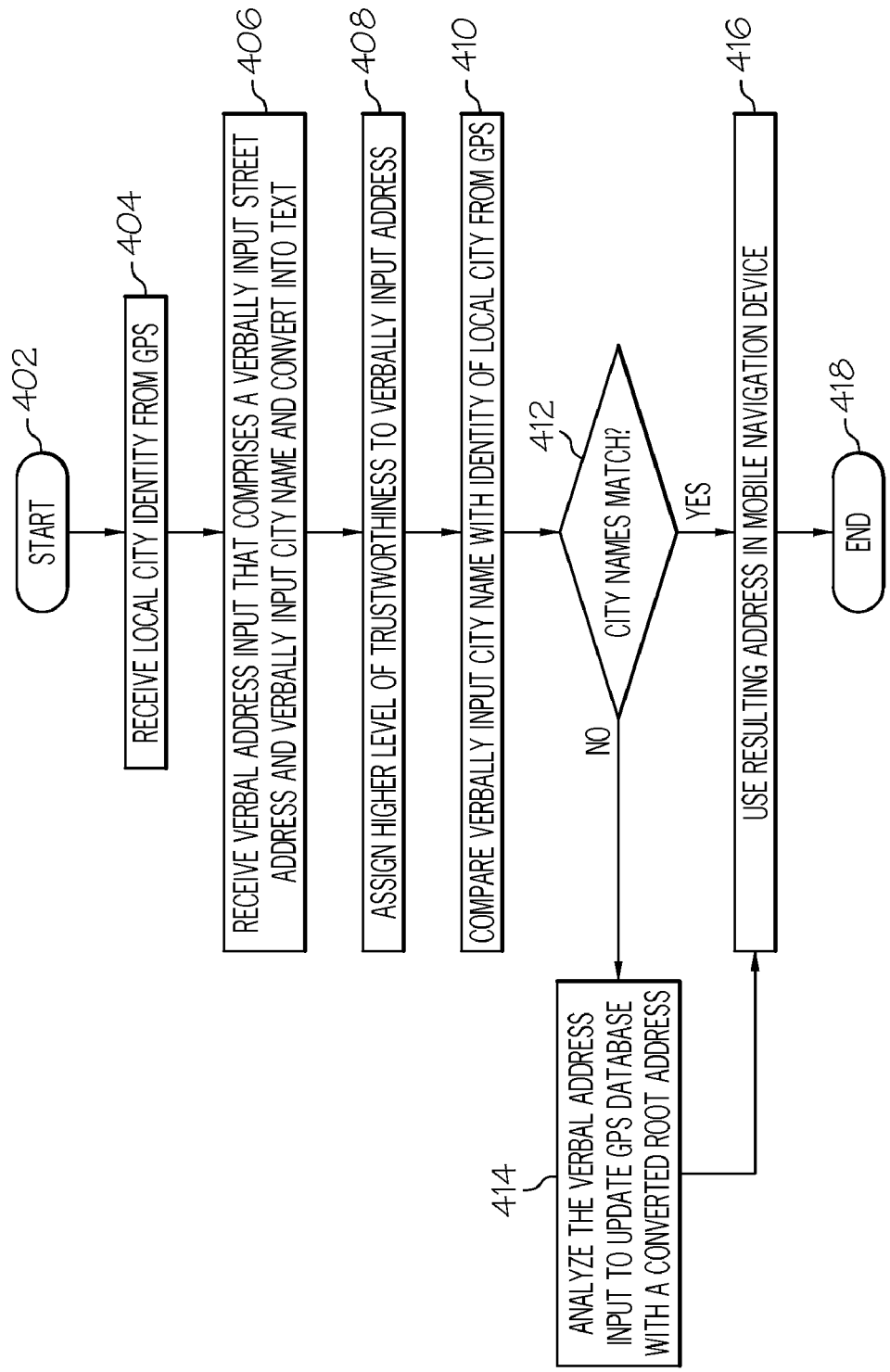
FIG. 4 is a high-level flow-chart of one or more exemplary steps performed by a processor to confirm a name of a local city and state for use by a GPS navigation system.

With reference now to FIG. 4, a high-level flow-chart of one or more exemplary steps performed by a processor to confirm a name of a local city and state for use by a GPS navigation system is presented. Note that the process depicted in FIG. 4 is used to confirm that the city name spoken by the user matches that city name for a current location of the mobile navigation device. However, it is understood that the present disclosure may be utilized to confirm any portion of an address, including a street name, a city name, a county name, a state name, a country name, etc. Therefore, the process depicted in FIG. 4 will be described in general terms, and then again in terms of confirming a city name.

After initiator block 402, the mobile navigation device receives a global positioning system (GPS) root address component from a GPS (block 404). The GPS root address component is a text name of a root location at which a mobile navigation device is currently located. As depicted in block 406, the mobile navigation device receives an orally entered address that comprises an oral root address component and an oral subunit component of the oral root address component. In one embodiment, the oral root address component is a street name of a street, wherein the oral subunit component is a street number on the street, and wherein the additional larger-scale geographic information from the GPS is a city name of a city in which the street is located. In another embodiment, the oral root address component is a city name of a city, wherein the oral subunit component is a street name of a street in the city, and wherein additional larger-scale geographic information from the GPS is a state name of a state in which the city is located. In another embodiment, the oral root address component is a state name of a state, wherein the oral subunit component is a city name of a city in the state, and wherein the additional larger-scale geographic information from the GPS is a country name of a country in which the state is located.

As further described in block 406, speech-to-text conversion of the orally entered address into a text address creates a converted root address component and a converted subunit component that respectively correspond with the oral root address component and the oral subunit component. As depicted in block 408, a higher level of trustworthiness is assigned to the converted root address component over the GPS root address component. The converted root address component is compared with the GPS root address component (block 410). If the converted root address component does not match the GPS root address component (query block 412), then an analysis is performed on the entire oral entry provided by the user (block 414). This analysis compares the GPS address components to the potential results from the oral root address components. Speech-to-text conversion returns a list of potential results ordered in probability order. For example, assume that the converted root address component had multiple possible matches in a GPS database, with each of the possible matches being ranked in order, based on the local GPS location. The analysis described in block 414 uses the top ranked root address from the GPS database. Normally, just the first set of results would be used when comparing to the current GPS location. However, this can be overridden such that other components of the address can be compared to entries in the GPS database. The resulting address is then used within the mobile navigation device (block 416) for processes such as providing present location information, driving directions to the input address, etc. The process ends at terminator block 418.

Assume now that the system is set up to confirm the city in which a driver is presently located. GPS systems often will "know" a main city's name, but not smaller incorporated cities, which are not in the GPS database of city names. Thus, referring again to the process described in FIG. 4, a local city name (identity) is received from a GPS (block 404). Note that the GPS is a system that comprises the space satellites that provide positioning data coordinates, a local computing system for converting these positioning data coordinates, a local or remote database of street names, cities, states, etc. that correspond with these positioning data coordinates, etc.

As described in block 406, a user then verbally (orally) inputs a street name and a city address of a desired destination and this spoken input is converted into computer-usable text. A higher level trustworthiness is given to the verbally input address (block 408), since it is assumed that the GPS database may not be aware of smaller incorporated cities within a larger metropolitan area, or the user is selecting a destination not within the current city. The orally input city name is compared with the name of the city that the GPS system believes is the present location of the mobile navigation device (block 410). If the orally input city name does not match the location that the city "known" be the GPS system to be the present location of the mobile navigation device (query block 412), then all of the address input orally by the user (including the street name, the city name, the state name, etc.) is used. Additionally, if the orally input city name matches the location that the city "known" be the GPS system to be the present location of the mobile navigation device (query block 412), then there is no need for the state name. Thus, the verbally input address is used to update the correct city name in the GPS database (block 414). The state name is then retrieved from the GPS system, and the full address is processed (i.e., driving directions to the full address), as described in block 416. The process ends at terminator block 418.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method of confirming an orally entered address that is entered into a mobile navigation device, the computer implemented method comprising:

receiving a global positioning system (GPS) root address component from a GPS, wherein the GPS root address component is a text name of a root location at which a mobile navigation device is currently located;

receiving an orally entered address, wherein the orally entered address comprises an oral root address component and an oral subunit component of the oral root address component;

speech-to-text converting the orally entered address into a text address, wherein the text address comprises a converted root address component and a converted subunit component that respectively correspond with the oral root address component and the oral subunit component;

assigning a higher level of trustworthiness to the converted root address component over the GPS root address component;
comparing the converted root address component with the GPS root address component;
in response to the converted root address component failing to match the GPS root address component, updating a GPS database by replacing the GPS root address component with the converted root address component;
in response to the converted root address component matching the GPS root address component, terminating any further speech-to-text conversion of the orally entered address and creating a complete text address using the converted subunit component, the converted root address component, and additional larger-scale geographic information from the GPS; and
the mobile navigation device processing the complete text address.

2. The computer implemented method of claim 1, wherein processing the complete text address comprises providing driving directions to the complete text address.

3. The computer implemented method of claim 1, wherein the oral root address component is a street name of a street, wherein the oral subunit component is a street number on the street, and wherein the additional larger-scale geographic information from the GPS is a city name of a city in which the street is located.

4. The computer implemented method of claim 1, wherein the oral root address component is a city name of a city, wherein the oral subunit component is a street name of a street in the city, and wherein the additional larger-scale geographic information from the GPS is a state name of a state in which the city is located.

5. The computer implemented method of claim 1, wherein the oral root address component is a state name of a state, wherein the oral subunit component is a city name of a city in the state, and wherein the additional larger-scale geographic information from the GPS is a country name of a country in which the state is located.

6. A computer system comprising:
a central processing unit; and
a computer readable memory coupled to the central processing unit, wherein the computer readable memory comprises software which, when executed, causes the central processing unit to implement:
receiving a global positioning system (GPS) root address component from a GPS, wherein the GPS root address component is a text name of a root location at which a mobile navigation device is currently located;
receiving an orally entered address, wherein the orally entered address comprises an oral root address component and an oral subunit component of the oral root address component;
speech-to-text converting the orally entered address into a text address, wherein the text address comprises a converted root address component and a converted subunit component that respectively correspond with the oral root address component and the oral subunit component;
assigning a higher level of trustworthiness to the converted root address component over the GPS root address component;
comparing the converted root address component with the GPS root address component;
in response to the converted root address component failing to match the GPS root address component, updating a GPS database by replacing the GPS root address component with the converted root address component;
in response to the converted root address component matching the GPS root address component, terminating any further speech-to-text conversion of the orally entered address and creating a complete text address using the converted subunit component, the converted root address component, and additional larger-scale geographic information from the GPS; and
processing the complete text address.

7. The computer system of claim 6, wherein processing the complete text address comprises providing driving directions to the complete text address.

8. The computer system of claim 6, wherein the oral root address component is a street name of a street, wherein the oral subunit component is a street number on the street, and wherein the additional larger-scale geographic information from the GPS is a city name of a city in which the street is located.

9. The computer system of claim 6, wherein the oral root address component is a city name of a city, wherein the oral subunit component is a street name of a street in the city, and wherein the additional larger-scale geographic information from the GPS is a state name of a state in which the city is located.

10. The computer system of claim 6, wherein the oral root address component is a state name of a state, wherein the oral subunit component is a city name of a city in the state, and wherein the additional larger-scale geographic information from the GPS is a country name of a country in which the state is located.

11. A computer program product comprising a computer readable storage medium embodied therewith, the computer readable storage medium comprising:
computer readable program code configured to receive a global positioning system (GPS) root address component from a GPS, wherein the GPS root address component is a text name of a root location at which a mobile navigation device is currently located;
computer readable program code configured to receive an orally entered address, wherein the orally entered address comprises an oral root address component and an oral subunit component of the oral root address component;
computer readable program code configured to speech-to-text convert the orally entered address into a text address, wherein the text address comprises a converted root address component and a converted subunit component that respectively correspond with the oral root address component and the oral subunit component;
computer readable program code configured to assign a higher level of trustworthiness to the converted root address component over the GPS root address component;
computer readable program code configured to compare the converted root address component with the GPS root address component;
computer readable program code configured to, in response to the converted root address component failing to match the GPS root address component, update a GPS database by replacing the GPS root address component with the converted root address component;
computer readable program code configured to, in response to the converted root address component matching the GPS root address component, terminate any further speech-to-text conversion of the orally entered address and create a complete text address using the converted subunit component, the converted root address component, and additional larger-scale geographic information from the GPS;

computer readable program code configured to create a complete text address using the converted root subunit text component, the converted root address component, and additional larger-scale geographic information from the GPS; and computer readable program code configured to process the complete text address.

12. The computer program product of claim 11, wherein processing the complete text address comprises providing driving directions to the complete text address.

13. The computer program product of claim 11, wherein the oral root address component is a street name of a street, wherein the oral subunit component is a street number on the street, and wherein the additional larger-scale geographic information from the GPS is a city name of a city in which the street is located.

14. The computer program product of claim 11, wherein the oral root address component is a city name of a city, wherein the oral subunit component is a street name of a street in the city, and wherein the additional larger-scale geographic information from the GPS is a state name of a state in which the city is located.

15. The computer program product of claim 11, wherein the oral root address component is a state name of a state, wherein the oral subunit component is a city name of a city in the state, and wherein the additional larger-scale geographic information from the GPS is a country name of a country in which the state is located.

* * * * *